Figure 1:
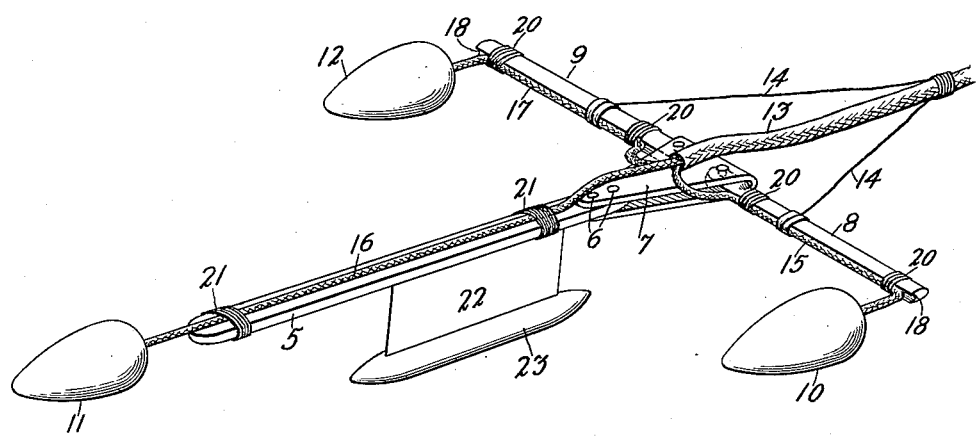

J. W. HORTON.
METHOD OF AND APPARATUS FOR DETECTING UNDER WATER VIBRATIONS.
APPLICATION FILED JUNE 24, 1919.

1,378,960.

Patented May 24, 1921.

Inventor:
Joseph W. Horton
by J. G. Roberts Atty.

UNITED STATES PATENT OFFICE.

JOSEPH WARREN HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

METHOD OF AND APPARATUS FOR DETECTING UNDER-WATER VIBRATIONS.

1,378,960. Specification of Letters Patent. Patented May 24, 1921.

Application filed June 24, 1919. Serial No. 306,491.

*To all whom it may concern:*

Be it known that I, JOSEPH WARREN HORTON, a citizen of the United States, residing at East Orange, in the county of Essex, State of New Jersey, have invented certain new and useful Improvements in Methods of and Apparatus for Detecting Under-Water Vibrations, of which the following is a full, clear, concise, and exact description.

This invention relates to a method of and apparatus for detecting under-water vibrations and more particularly to a method of detecting under-water vibrations by means of a plurality of detecting devices adapted to be towed through the water. The invention also relates to apparatus for supporting a plurality of such detecting devices at fixed distances apart and in such a manner that they may be towed through the water without causing undue vibration of the detectors themselves.

In the detection of under-water vibrations, such, for example, as those used in submarine signaling or the vibrations set up by submarine vessels, it is often desired to determine the direction of the source of sound very quickly and without altering the course of the vessel upon which the observations are being made. Heretofore, it has been proposed to determine this direction by using detectors which may be of the ordinary microphone type, mounting them on opposite sides of the boat, altering the course of the boat in order to provide a sound-shadow for one or the other of the detectors and thereby determining the direction from which the vibrations are propagated. This method, however, was not entirely satisfactory since the detectors themselves were subjected to continual disturbances set up by the machinery of the towing vessel and also vibrations resulting from the beating of the waves against the sides of the vessel and the action of the propeller. A further disadvantage of this method is that it necessitates altering the course of the vessel upon which the observations are being made. To overcome the disturbances caused by the operation of the machinery, the effects of waves, and the action of the propeller, it has been proposed to mount a pair of detectors on a device which can be towed at a considerable distance from the vessel and listen binaurally to the operation of these detectors. However, for a single position it is possible to obtain a binaural balance, indicating either the direction of the source of sound or its binaural image and it is therefore necessary to take a plurality of readings at different angles in order to determine the actual direction of the source of sound, thus necessitating altering the ship's course.

It is the object of the present invention to provide a device which may be towed below the surface of the water and which is provided with a plurality of detecting devices mounted a fixed distance apart and so arranged that their base lines or the lines between each pair of detectors, intersect. By means of such an arrangement, the observer may listen on different pairs of detectors, obtain a binaural balance for each pair and deduce from these observations, the actual position of the source of sound without making it necessary to alter the course of the towing vessel.

A further object of this invention is to provide the necessary towing apparatus which is compact and can be easily handled when removed from the water.

To accomplish these objects and in accordance with this invention, there is provided a stream line framework comprising a fixed longitudinal arm and a pair of pivoted horizontal arms so arranged that a detecting device may be supported at the outer end of each arm and these devices held in a fixed relation to each other while the apparatus is being towed through the water.

Figure 2:
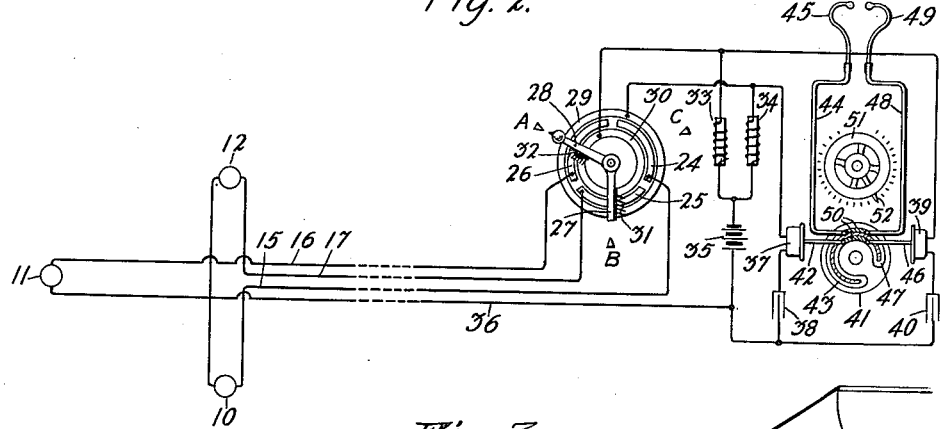
Figure 3:
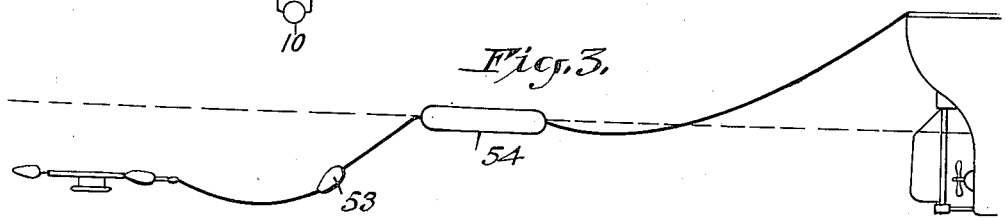

The various features of this invention will be more clearly understood by reference to the accompanying drawing in which Figure 1 is a perspective view of the means employed for maintaining the detectors a fixed distance apart when being towed; Fig. 2 shows diagrammatically a preferred form of circuit arrangement which may be used in connection therewith; and Fig. 3 shows a method of using the device.

Referring now to the drawings, there is disclosed a framework comprising a longitudinal arm 5 rigidly secured by means of the bolts 6—6 to a triangular plate 7. Pivotally supported on the plate 7 are the horizontal arms 8 and 9, each of which is made of stream line construction in order to facilitate its motion through the water. Three separate detecting devices or detectors 10, 11 and 12 are provided and are secured at the outer end of the arms 10, 11 and 12 respectively. These detecting devices are preferably of the type disclosed in detail in my copending application, Serial No. 334,684, filed October 31, 1919. Secured to the towing cable 13 are the bridle-members 14—14, preferably of marlin, which are attached to the horizontal arms 8 and 9 and take up the strain of towing the apparatus through the water. The cable 13 comprises an insulated electrical conductor 15 which is electrically connected to the detector 10, an insulated conductor 16 connected to detector 11, and an insulated conductor 17 connected to detector 12. The conductors 15 and 17 are inserted in slots 18—18 at the rear of arms 8 and 9 and are bound in place, as shown for example, at the points 20—20. The conductor 16 is bound to the longitudinal arm 5, as at 21—21. The length of the conductors 15, 16 and 17 is such as to provide a short-length for towing the detectors from the ends of the arms, this length being the same for all detectors so that their relative position remains the same irrespective of whether the device is being towed or is simply drifting. Since the arms 8 and 9 are pivotally connected to the plate 7, when the apparatus is removed from the water these arms may be folded back parallel to the arm 5 making the framework compact and easily handled. When the device is being towed, these arms are held substantially perpendicular to arm 5 by the tension of the bridle members 14—14, and their forward movement is limited by the front portion of plate 7 which acts as a stop member.

To prevent the apparatus from rolling or rotating as it is drawn through the water, there is attached to the arm 5, a keel 22 preferably of thin sheet metal having its lower portion weighted, as shown at 23, so that the center of gravity of the device is low. The framework itself is so designed that the device, as a whole, has a slight amount of positive buoyancy, the center of buoyancy being approximately in alinement with, and above the center of gravity of the device. To insure that the device while being towed remains a suitable distance under the surface of the water, it is the practice to attach a weight 53 to the towing cable a short distance ahead of the device. When it is desired to take readings while drifting, a float member 54 is also attached to the cable to counterbalance the towing weight. The positive buoyancy of the device is great enough to counter-balance the downward pull of one-half of the cable between the weight 53 and the device, and, since the center of gravity and center of buoyancy of the device are approximately in alinement, the device remains under the surface of the water and on substantially an even keel.

The method of using this apparatus to detect under-water vibrations will now be described in connection with the circuit arrangement shown diagrammatically in Fig. 2. The conductors 15, 16 and 17 are connected respectively to the segments 24, 25 and 26 of a rotary switch which is provided with a pair of rotatable arms 27 and 28 maintained at a fixed angle with respect to each other. This switch is also provided with an outer ring 29 and an inner ring 30. The arm 27 is provided with an insulated brush 31, which, upon rotation in a clockwise direction, successively connects the segments 24, 25 and 26 with the outer ring 29, and the arm 28 is provided with a brush 32, which, as it rotates in a clockwise direction, connects the segments 25, 26 and 24 with the inner ring 30. Connected in series between the rings 29 and 30 are a pair of impedance coils 33 and 34. A battery 35 has one of its terminals connected to the point joining the impedance coils 33 and 34 and its other terminal is connected to the cable conductor 36 which is joined in common to one side of the detectors 10, 11 and 12. Bridged about the impedance coil 34 and battery 35 is a receiver 37 and a condenser 38 joined in series, while bridged about the impedance coil 33 and battery 35 is the receiver 39 and the condenser 40. The receivers 37 and 39 are associated with a compensating device 41 which may be of the type disclosed in an application to John J. Kuhn, Serial No. 306,449, filed June 24, 1919, by means of which it is possible to listen to the operation of the detectors binaurally and obtain a balance. Sound generated in the receiver 37 is transmitted to one ear of the listener by means of the fixed tube 42, adjustable tube 43, fixed tube 44 and stethoscopic ear tube 45. Sound generated in the receiver 39 is transmitted to the other ear of the observer by means of the fixed tube 46, adjustable tube 47, fixed tube 48 and stethoscopic ear tube 49. The adjustable tubes 43 and 47 are circular in form and reversed as shown, and are closed at the ends by means of the stops 50—50. These tubes are adapted to be rotated by means of the handle 51 while the stops 50 are held stationary, thus making it possible to increase the length of one tube and simultaneously decrease the length of the other tube. When rotated in a clockwise direction, the length of tube 47 is increased and the length of tube 43 is decreased. On the contrary, if rotated in an anti-clockwise direction, the length of tube 47 is decreased and that of tube 43 is increased.

Assuming the switch-arms 27 and 28 to be as shown at position designated A, the segment 25 is connected by means of brush 31 with the outer conducting ring 29 and the segment 26 is connected by means of brush 32 with the inner conducting ring 30. A circuit is thus provided from battery 35 to impedance 33, inner ring 30, brush 32, segment 26, conductor 16, detector 11 and thence back to battery through the common-return conductor 36. Since the receiver 39, in series with condenser 40, is bridged across the impedance 33 and battery 35, any variation in detector 11 is detected by this receiver. At the same time a circuit is also provided from battery 35 to impedance 34, outer ring 29, brush 31, segment 25, conductor 17 to detector 12 and thence back to battery through common-return conductor 36. The receiver 37, in series with the condenser 38, is bridged across impedance 34, hence any variation in detector 12 is manifested in receiver 37. Thus with the position of the switch as shown, receiver 37 is operated as a result of vibrations affecting detector 12 and receiver 39 as a result of vibrations affecting detector 11. The observer, upon listening to the sounds picked up by these detectors, rotates the handle 51 of the compensator 41, thereby rotating the tubes 43 and 47 until a binaural balance is obtained. When the effect of the sound received in either ear is the same, the direction of the source of sound is then determined by the relative length of the ear paths from the two receivers. The pointer 52, located on the handle 51, of the compensator is provided to indicate the comparative lengths of these ear paths and, as a result, the direction of the source of sound from the base-line joining the two detectors. For any given setting of the conpensator there are two positions of the sound which will give a binaural balance, each making the same angle with the base-line joining the two detectors. Observations made at one position, therefore, indicate that the source of sound is in one of two directions and to definitely locate the true source, it is necessary to make a second determination for a different angle. With the apparatus as described, this can be very quickly done by rotating the arms 27 and 28 of the switch in a counter-clockwise direction so that the pointer on arm 28 is opposite the position B and then obtaining a balance, using another pair of detectors. For this position of the switch, the necessary circuit arrangements are made to permit the observer to obtain a binaural balance between detectors 10 and 12. The results of this balance, together with the balance obtained for detectors 11 and 12, will, in general, allow the observer to determine the true location of the source of sound but, in case ambiguity still remains, the arms 27 and 28 of the switch will be again rotated in a counter-clockwise direction until the pointer on arm 28 registers with the indicating position C. For this condition of the switch, segment 24 will be joined with inner conducting ring 30, and segment 26 will be joined to the outer conducting ring 29, thus making it possible to obtain a binaural balance between detectors 10 and 11. With three such readings, there will no longer be any ambiguity as to the true direction of the source of sound.

With the towing arrangement described above, it is obvious that a series of readings may be quickly obtained on the three different sets of detectors without altering the course of the vessel and from these readings the source of sound can be definitely located. The particular form of the framework illustrated permits the detectors being towed through the water at a fixed distance apart without causing undue disturbances due to friction of the water with the framework. Since the detectors are not supported directly by the framework but rather by a short-length of the conductor, any vibrations set up in the framework are not transmitted to the detectors. Also this arrangement eliminates the disturbance usually termed "mechanical cross-talk" which is brought about by the response of one detector to vibration set up in another detector and transmitted mechanically along the framework.

What is claimed is:

1. A method of determining the location of a source of under-water vibrations which consists in towing a plurality of vibration-detecting devices through the water, maintaining such devices in fixed space-relation on intersecting base lines and obtaining a binaural balance between the response of said devices whereby the location of said source may be determined.

2. A method of determining the location of a source of under-water vibrations which consists in towing a plurality of vibration-detecting devices through the water, maintaining such devices in fixed space-relation on intersecting base lines and successively obtaining a binaural balance between the response of said devices by pairs whereby the location of said source may be determined.

3. In apparatus for determining the location of a source of under-water vibrations, the combination with a plurality of detecting devices, of means for flexibly supporting said devices in fixed space-relation on intersecting base lines and means for towing said devices through the water.

4. In apparatus for determining the location of a source of under-water vibrations, the combination with a plurality of detecting devices, of means for yieldingly supporting said devices in fixed space-relation on intersecting base lines and means for towing said devices through the water.

5. In apparatus for determining the location of a source of under-water vibrations, the combination with a plurality of detecting devices, of flexible means for supporting said devices in fixed space-relation on intersecting base lines while being towed through the water and maintaining such space-relation when the apparatus is not in motion.

6. In apparatus for determining the location of a source of under-water vibrations, the combination with a plurality of detecting devices, of means for towing said devices through the water, and means for yieldingly supporting said devices in fixed space-relation on intersecting base lines, said supporting means comprising a T-shaped framework built on stream lines.

7. In apparatus for determining the location of a source of under-water vibrations, the combination with a plurality of detecting devices, of means for supporting said devices equally spaced apart and in triangular formation while being towed, said means comprising a rigid longitudinal arm and a pair of pivoted horizontal arms.

8. In apparatus for determining the location of a source of under-water vibrations, the combination with a framework adapted to be towed through the water and comprising a plurality of intersecting arms, of detecting devices flexibly mounted at the ends of said arms.

9. In apparatus for determining the location of a source of under-water vibrations, a framework adapted to be towed through the water and comprising a plurality of intersecting arms, a cable for towing said framework, said cable including a plurality of conducting strands extending along and secured to the arms of said framework, and detecting devices flexibly secured by the conducting strands at the ends of said conducting arms.

10. In apparatus for detecting the direction of a source of under-water vibrations, the combination of a float member adapted to float upon the surface of the water, a supporting framework having positive buoyancy, a plurality of detecting devices supported upon said framework in fixed space-relation, a cable joining said float and framework, and a weight attached to said cable, said framework having its center of buoyancy substantially in alinement with and above its center of gravity.

In witness whereof I hereunto subscribe my name this 16th day of June, A. D. 1919.

JOSEPH WARREN HORTON.